United States Patent

Ringstad

3,860,873

Jan. 14, 1975

[54] FM TRANSMISSION SYSTEM

[75] Inventor: John E. Ringstad, Huntington Beach, Calif.

[73] Assignee: Tape-Athon Corporation, Inglewood, Calif.

[22] Filed: Oct. 1, 1971

[21] Appl. No.: 185,564

[52] U.S. Cl. .......................... 325/308, 178/DIG. 13

[51] Int. Cl. .......................... H04b 3/54

[58] Field of Search .......... 325/3, 9, 33, 45, 47, 48, 325/308, 345, 461; 333/3, 6, 8; 178/DIG. 13, 178/DIG. 23, 5.6, 5.8 R; 179/15 BT

[56] References Cited

UNITED STATES PATENTS

| | | | |
|---|---|---|---|
| 2,463,505 | 3/1949 | Atkins et al. | 325/9 |
| 2,531,199 | 11/1950 | Darling | 325/9 |
| 2,704,362 | 3/1955 | Bergan | 325/9 |
| 2,831,105 | 4/1958 | Parker | 325/3 |
| 3,135,922 | 6/1964 | Eland | 325/461 |
| 3,333,198 | 7/1967 | Mandell et al. | 325/461 |
| 3,534,172 | 10/1970 | Weeda | 179/15 BT |
| 3,665,311 | 5/1972 | Gargini | 325/308 |
| 3,701,946 | 10/1972 | Anderson | 178/5.6 |

OTHER PUBLICATIONS

"VHF–UHF Broad–Band TV Distribution in Brussels" by Backers, Proc. Soc. Relays Engineers, Vol. 8, No. 2., Apr. 1970.

Hickman et al., "Multi-Cable Solution to Communications Systems Problems," Mar. 22, 1971, Discade p. 3.

Taylor et al., "Field Testing the Performance of a Cable TV System," Jul. 70, proceedings of the IEEE pp. 1086–1102.

"Scanning the CATV Scope" by Leo G. Sands in "Broadcast Engineering," Oct. 1971.

"Community Antenna Television System" by Chipp in "IEEE Spectrum," July 1966.

*Primary Examiner*—Benedict V. Safourek
*Assistant Examiner*—Jin F. Ng
*Attorney, Agent, or Firm*—Fraser & Bogucki

[57] ABSTRACT

An FM transmission system is disclosed in which audio signals are stereo multiplexed prior to being applied to produce corresponding FM signals having carrier frequencies outside of the normal FM commercial transmission band of 88–108 megahertz. The FM signals are combined onto the cable of a cable television system for transmission to subscribers equipped with decoding circuitry. The decoding circuitry responds to FM signals which have been separated from television signals by shifting the carrier frequencies of the FM signals into the normal FM band for use with the subscriber's standard FM receiver. The resulting FM transmission system provides for the transmission of private FM programs originating at the television cable station or head-end over the cable to subscribers who are equipped to receive such programs, without interference with either the television signals or commercially broadcast FM signals carried by the cable.

2 Claims, 14 Drawing Figures

INVENTOR.
JOHN E. RINGSTAD
BY Fraser and Bogucki
ATTORNEYS

INVENTOR.
JOHN E. RINGSTAD

BY Fraser and Bogucki

ATTORNEYS

PATENTED JAN 14 1975

3,860,873

SHEET 03 OF 11

INVENTOR.
JOHN E. RINGSTAD

BY Fraser and Bogucki
ATTORNEYS

INVENTOR.
JOHN E. RINGSTAD
BY Fraser and Bogucki
ATTORNEYS

INVENTOR.
JOHN E. RINGSTAD
BY Fraser and Bogucki
ATTORNEYS

INVENTOR.
JOHN E. RINGSTAD
BY Fraser and Bogucki
ATTORNEYS

PATENTED JAN 14 1975

3,860,873

SHEET 07 OF 11

INVENTOR.
JOHN E. RINGSTAD

BY Fraser and Bogucki

ATTORNEYS

INVENTOR.
JOHN E. RINGSTAD
BY Fraser and Bogucki
ATTORNEYS

INVENTOR.
JOHN E. RINGSTAD

BY *Fraser and Bogucki*
ATTORNEYS

INVENTOR.
JOHN E. RINGSTAD
BY Fraser and Bogucki
ATTORNEYS

INVENTOR.
JOHN E. RINGSTAD
BY Fraser and Bogucki
ATTORNEYS

FM TRANSMISSION SYSTEM

BACKGROUND OF THE INVENTION

1. Field of the Invention

This invention relates to FM transmission systems, and more particularly to a system in which stereo multiplexed audio signals are transmitted as FM signals over a community antenna television cable or similar line.

2. History of the Prior Art

The widespread development of community antenna television (CATV) systems has opened up numerous possiblilties for selective audio and video braodcasting to all or selected ones of the subscribers in a given system. For example, systems are being developed in which special events of local interest and other subject matter not normally televised by the regular local commercial television stations are televised by one or more private stations in association with a cable television system. The special event programs are transmitted over the cable in such fashion as to not interfere with normal television broadcasting. Those subscribers of the cable system interested in receiving this special program material may by payment of additional fees to the cable system be equipped with apparatus which provides for the receipt of the special programming material on their television sets.

Most television cable systems receive commercially broadcast FM signals as well as television signals. It is therefore possible for a subscriber with an FM receiver to enjoy good FM reception as well as good television reception. However, the commercially broadcast FM program material which is available sometimes leaves much to be desired. In the first place, FM reception may be limited to a few stations or perhaps none at all in all except large metropolitan areas. Then too even where a considerable number of stations are available, such stations may not provide certain types of music, for example, or may interrupt the programs for commercial messages with annoying frequency.

Accordingly, it would be advantageous to provide an FM transmission system for use with cable television and similar closed or private systems in which one or more audio signals provided at the cable station or head-end may be transmitted over the cable as FM signals, in stereo multiplexed fashion where desired, to some or all of the subscribers of the cable system so as to supplement the audio and video program material normally available. However such special programming material should not interfere with normal television or FM broadcasting, at least until the various signals are received by the subscriber so that he may make a personal choice as to whether he wishes to listen to certain private programming material to the exclusion of otherwise available commercially broadcast material. Moreover the complexity and resulting cost of any such FM transmission system should be minimized. It is thus important to be able to equip each interested subscriber with receiving circuitry of compact size and which does not involve undue expense to the cable television company or to the individual subscriber. The community antenna television station or head-end often consists of a building or location of limited space which is unmanned. In such situations in particular, it is important that any such FM transmission system have transmitting apparatus which is very small and compact and relatively maintenance free as well as being of low cost.

It is therefore an object of the present invention to provide a system for the transmission of audio signals as FM signals over television cables and similar conductive media.

A further object of the present invention is to provide a system for the FM transmission of audio signals over a television cable system in stereo multiplexed fashion where desired and without interference with commercially broadcast television and FM signals.

A still further object of the present invention is to provide a FM transmission system of low cost and compact size for use with a cable television system.

BRIEF DESCRIPTION OF THE INVENTION

The present invention provides an FM transmission system of relatively simple construction and low cost in which one or more audio signals are stereo multiplexed where desired prior to being applied to produce corresponding FM signals having a frequency outside of the normal or commercial FM band so that the FM signals so produced can be transmitted over the cable of the television system without interference with either commercially broadcast FM or the television signals. At each subscriber's station, the privately produced system FM signals are altered so that they may be received by conventional FM receiving equipment using special decoding circuitry which responds to all FM signals, both commercial and system, after separation from the television signals. The comercial FM signals are passed through the decoding circuitry with practically no interference. On the other hand, the system FM signals are amplified and the carrier frequency thereof shifted to a selected value within the normal FM band so that they may be received by conventional FM receivers.

In one preferred arrangement of an FM transmission system in accordance with the invention, the opposite stereo channel signals comprising each audio signal and which are produced by automatic magnetic tape playing apparatus or the like are preamplified prior to being stereo multiplexed. Multiplexing is accomplished by producing the sum and difference of the opposite stereo channel signals with the difference signal being applied to amplitude modulate a sub-carrier signal having twice the frequency of a pilot carrier signal. Signals representing the sum, the modulated sub-carrier and the pilot carrier are then combined and amplified to produce a composite output signal to an FM modulator. The multiplexer comprises circuitry which does not require variable inductors or capacitors and which may therefore to fabricated as an integrated circuit of very compact size. Use of a crystal controlled oscillator to provide both the sub-carrier and the pilot signals results in pure waveforms which are relatively free from distortion.

The stereo multiplexed signal at the output of the multiplexer is used to produce a corresponding FM signal by first applying it to an FM oscillator to produce an FM signal of nominal frequency. Frequency distortion within the FM oscillator is minimized by a frequency locked loop which may be fabricated as an integrated circuit comprising a single operational amplifier. The FM signal of nominal waveform produced by the FM oscillator is then mixed with a high frequency signal in a balanced modulator which subtracts the two signals to provide an FM signal having a desired carrier frequency within the normal FM band and without degrading stereo channel separation. The high frequency signal is provided by a crystal controlled oscillator, again for purity of waveform, and the balanced modulator which may comprise a diode ring and associated transformers is successfully isolated at both inputs thereof by pads of resistors. The FM signal of selected carrier frequency as so produced by the balanced modulator is applied to an RF amplifier where its level is adjusted by a potentiometer and associated diode which selectively back bias or pinch off an associated transistor within the amplifier to provide the desired level. The FM signal as so adjusted is then applied to a bandpass filter which eliminates one of the sidebands of the FM signal as well as FM signals at other carrier frequencies which may be present.

The signal sideband FM signal as provided by the FM modulator is combined with FM signals produced by other modulators for transmission over the cable by a transformer tree comprising combinations of symmetrical and asymmetrical bifilar transformers. The FM signals produced by the various modulators have carrier frequencies which are sufficiently different from one another to prevent interference between the signals and yet which occupy a relatively small common portion of the frequency band passed by the cable.

Each subscriber's location or station includes an FM-TV splitter comprising an arrangement of asymmetrical and symmetrical bifilar transformers coupled to the cable so as to extract the signals transmitted thereby and thereafter separate the FM signals from the TV signals. At this point, the extracted FM signals comprise those signals provided by the modulators at the head-end of the system and which have carrier frequencies outside the normal FM band as well as FM signals resulting from commercial FM broadcasting which have been picked up by the antenna of the cable system. It is therefore necessary to decode the modulator produced FM signals by shfiting their carrier frequencies into the normal FM band for receipt by the subscriber's FM receiver. At the same time the commercial FM signals should ideally be passed to the FM receiver without interference by the decoding operation. This is accomplished in accordance with the invention by a decoder which is coupled between the TV-FM splitter and the FM receiver at each subscriber's station.

FM signals entering one particular form of the decoder are applied to a bandpass filter to pass the system FM signals with little or no attenuation while at the same time attenuating all other signals including commercial FM signals within the normal FM band by a selected amount. The FM signals at the output of the bandpass filter are applied to a mixer together with a reference signal of selected high frequency from a local oscillator. The mixer which may comprise an integrated operational amplifier produces various combinations of the FM signals and the high frequency signal including the difference between the system FM signals and the high frequency signal. The high frequency reference signal is chosen so as to provide such difference FM signals with predetermined carrier frequencies within the normal FM band. The mixer also has a gain which results in amplification of the FM signals provided thereby by an amount substantially equal to the attenuation of the bandpass filter at the input. Accordingly those commercial FM signals which are attenuated by the bandpass filter are amplified in the mixer so as to appear at the mixer output with an amplitude substantially equal to the amplitude of such signals at the input to the decoder. Thus, signals are substantially unaffected by the decoder. At the same time, however, the system FM signals which receive little or no attenuation by the input bandpass filter are amplified in the mixer so as to appear at the output thereof with a substantially increased amplitude. This not only facilitates the reception of such signals by the FM receiver but also provides for the conversion of such signals to a particular frequency within the normal FM band which is at or close to a frequency normally occupied by a commercial FM station. In such instances, it may be appropriate or desirable to block out the commercial FM station and replace it with the system FM signal. The system and commercial FM signals at the output of the mixer are passed to the subscriber's FM receiver via an output bandpass filter which severely attenuates and thereby eliminates signals outside of the normal FM band including any sum and other unwanted signals produced by the mixer.

The decoder circuit includes an electronic filter coupled to the circuit power supply for filtering AC ripple which might otherwise produce unwanted hum. The filter includes a transistor coupled in emitter follower fashion between the power supply and selected parts of the decoder circuitry as well as a Zener diode which is coupled to the transistor base.

As alternative embodiment of the decoder comprises a broadband frequency convertor which is well matched to the cable so as to enable conversion of a wide range of frequencies with good isolation and minimum standing wave ratio. In this embodiment, the entering FM signals are passed by an input matching network to an RF amplifier within a cascade stage. The RF amplifier and an associated series trap isolate the input from a mixer which is located within the cascade stage and which mixes the FM signals with a high frequency signal provided by a local oscillator. The mixer passes the commercial FM signals to an output with some amplification which provides even greater amplification of the difference between the system FM signals and the high frequency signal from the oscillator. Subtraction of the system FM signals from the high frequency signal effectively shifts the carrier frequency of the system FM signals into the normal FM band. The subscriber's FM receiver then acts as an output filter by receiving only those FM signals within the normal FM band to the exclusion of all others. The FM signals produced by the mixer are passed to the output via an output matching network which also provides isolation and minimizes standing wave ratio.

BRIEF DESCRIPTION OF THE DRAWINGS

The foregoing and other objects, features and advantages of the invention will be apparent from the following more particular description of preferred embodiments of the invention, as illustrated in the accompanying drawings, in which:

FIG. 5 is a block diagram of one preferred arrangement of an FM modulator for use in the system of FIG. 1;

DETAILED DESCRIPTION

Figure 1:
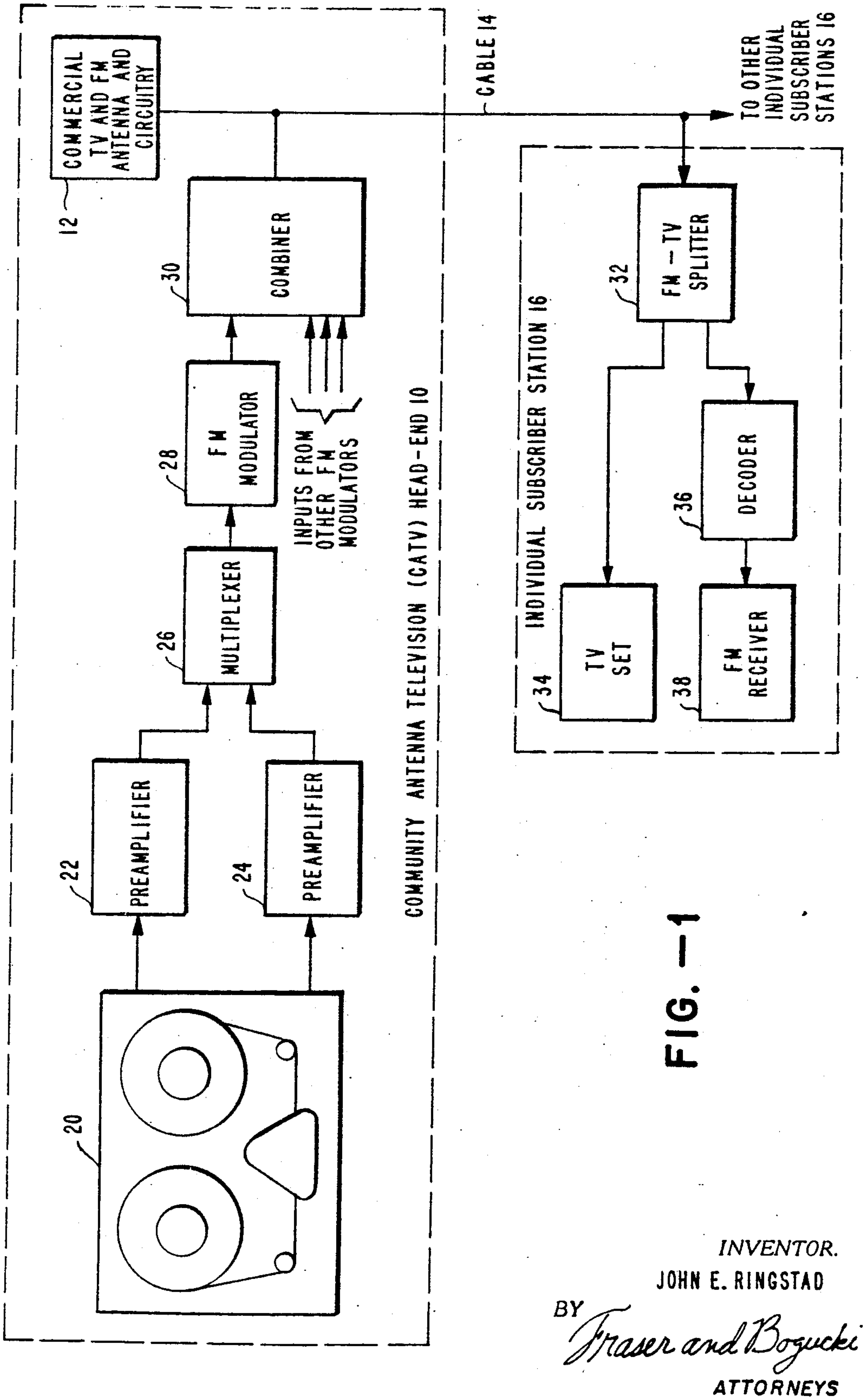
FIG. 1 is a block diagram of an FM transmission system in accordance with the invention.

The invention is shown in FIG. 1 and described hereafter in terms of its application to a cable television system. However it will be appreciated by those skilled in the art that the invention has application in virtually any environment in which it is desired to transmit audio signals over a conductive transmission member as FM signals for receipt by FM receiving equipment and without interference with FM signals of known carrier frequency which are already present.

The particular arrangement of FIG. 1 includes a community antenna television (CATV) station or head-end 10 which is equipped with an antenna and circuitry 12 for receiving commercially broadcast television and FM signals and for processing such signals for transmission over a cable 14 to a plurality of individual subscriber locations or stations 16. The head-end 10 may comprise an elaborate facility for very large cable systems, but is more typically a small unmanned building for housing the antenna and circuitry 12. Conventional broadcasting equipment would prove to be much too large for most such installations. Accordingly it is important that the part of the FM transmission system located within the head-end be relatively compact and maintenance free. It is also desirable that the equipment be relatively low in cost so that the FM transmission system can be added to the cable system without a great deal of expense either to the operator of the cable system or to the individual subscribers. Since the individual subscriber stations 16 may number in the thousands, it is particularly important that that portion of the FM transmission system located within each station 16 be inexpensive as well as compact in size and relatively maintenance free. As will become more apparent from the discussion to follow, circuitry of compact size and low cost is achieved in accordance with the invention by use of circuit designs which are easily fabricated in integrated form and which greatly minimize the use of relatively large components such as variable inductors and capacitors. Also the reliability of such circuitry is greatly enhanced by the circuit designs themselves and by liberal use of components such as crystal controlled oscillators which provide relatively pure waveforms and thereby greatly minimize distortion problems.

Referring to FIG. 1, the transmitting portion of the FM transmission system which is contained within the head-end 10 includes an appropriate source for the audio signals comprising the private programming material such as a magnetic tape player 20. The tape player 20 is preferably of the stereo type with automatic reverse features so that stereo music or other selected programming material recorded on the tape can be played on a 24-hour basis. The opposite channel signals of the stereo audio signal provided by the tape player 20 are applied to preamplifiers 22 and 24 before being passed to a multiplexer 26. The preamplifiers 22 and 24 provide the necessary gain and compensation to drive the modulator described hereafter. The multiplexer 26 stereo multiplexes the two input signals to produce a multiplexed sub-carrier signal which is applied to an FM modulator 28. The modulator 28 responds to the multiplexed signal by generating a corresponding FM signal having a carrier frequency which is outside of the normal FM band. For purposes of present discussion, the normal FM band is deemed to be that band which encompasses normal commercial FM braodcasting or 88–108 megahertz. The carrier frequency of the FM signal produced by the modulator 28 may be either above or below but in any event is outside of the normal 88–108 megahertz band so as not to interfere with commercial FM signals transmitted over the cable 14. The particular carrier frequencies chosen for the outputs of the modulator 28 and other modulators within the system are chosen in accordance with a number of factors discussed hereafter including freedom from interference with the television signals and compatibility with the bandwidth capabilities of the cable 14.

The tape player 20, the preamplifiers 22 and 24, the multiplexer 26 and the FM modulator 28 constitute one of several different stations or programs which may comprise the FM transmission system. For convenience of illustration only the one such private station is shown in FIG. 1. The outputs of the FM modulators in any other stations are applied to a combiner 30 together with the output of the FM modulator 28 where the various FM signals are applied to the cable 14 for transmission to the individual subscriber stations 16. As discussed hereafter, the carrier frequencies of the FM signals produced by the various modulators are separated from one another so as to prevent interference, and yet are sufficiently closely related so as to comprise a very small segment of the overall bandwidth which the cable 14 is capable of handling.

The system FM signals produced within the head-end 10 are transmitted over the cable 14 together with commercial FM signals and television signals received and processed by the antenna and circuitry 12. At each individual subscriber station 16, the television signals are separated from the system and commercial FM signals by an FM-TV splitter 32 with the television signals being passed to the subscriber's TV set 34. The FM signals are applied via a decoder 36 to the subscriber's conventional FM receiver 38. The decoder 36 which passes the commercial FM signals to the receiver 38 virtually without interference shifts the carrier frequency of each system FM signal to a value within the normal FM band. Accordingly the receiver 38 which is tuned to this normal band is capable of receiving such FM signals and reproducing the audio carried thereby without modification.

Figure 2:
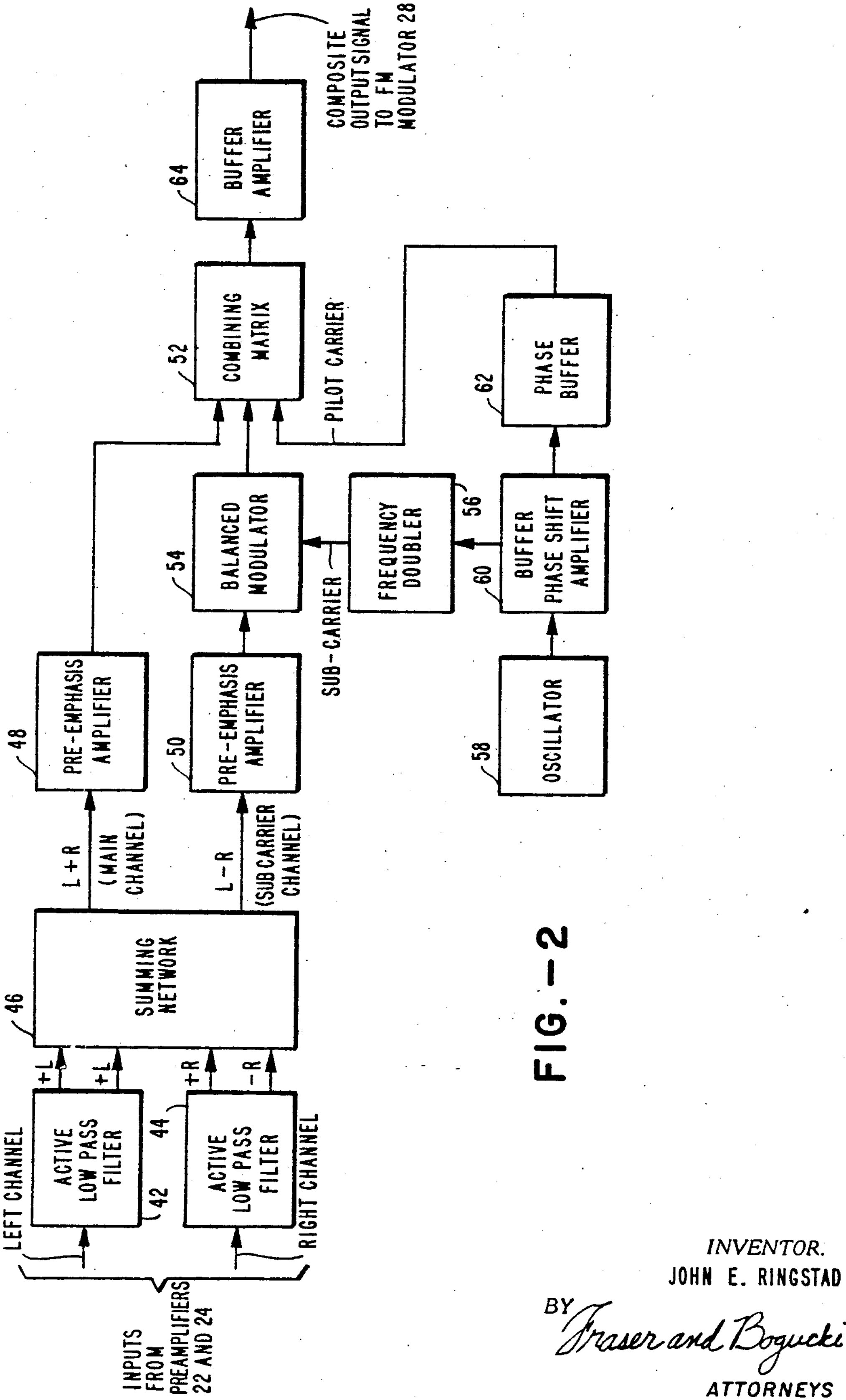
FIG. 2 is a block diagram of one preferred arrangement of a multiplexer for use in the system of FIG. 1.

One preferred arrangement of the multiplexer 26 of FIG. 1 is shown in block diagram form in FIG. 2. As shown in FIG. 2, the left channel output of the tape player 20 as amplified by the preamplifier 22 is applied to an active low pass filter 42 which eliminates any frequencies above 15 kilohertz in compliance with federal regulations. At the same time the right channel output of the tape player 20 as amplified by the preamplifier 24 is applied to an active low pass filter 44 which filters out frequencies above 15 kilohertz and also contains a phase splitter for effectively providing the true and complementary values +R and −R of the signal. The outputs of the filters 42 and 44 are applied to a summing network 46 where they are combined in such a way as to produce the sum L+R in the left or main channel and the difference L−R in the right or subcarrier channel. Such signals are respectively applied to preemphasis amplifiers 48 and 50 which contain the 75 microsecond response curves required for wideband commercial FM broadcasting. The sum signal L+R at the output of the amplifier 48 is passed to a combining matrix 52. The difference signal L−R at the output of the amplifier 50 is applied to a balanced modulator 54.

The balanced modulator 54 applies the sub-carrier channel difference signal L−R to amplitude modulate a sub-carrier signal provided by a frequency doubler 56 with the resulting amplitude modulated signal being passed to the combining matrix 52. The frequency doubler 56 provides the sub-carrier signal by doubling the frequency of a pilot carrier signal produced by an oscillator 58. The pilot carrier signal is also passed through a buffer phase shift amplifier 60 with the phase thereof shifted by a selected amount prior to passage to a phase buffer 62. The amplifying portion of the amplifier 60 maintains stability of the oscillator 58 and minimizes circuit perturbations. The phase buffer 62 comprises a buffer amplifier which enables adjustment of the amplitude of the pilot carrier signal prior to the passage of such signal to the combining matrix 52.

In the present example, the oscillator 58 has a frequency of 19 kilohertz which is fixed by federal regulations. Accordingly, the sub-carrier signal has a frequency twice that of the pilot carrier or 38 kilohertz. Phase shift of the pilot carrier signal is provided by the amplifier 60 as necessary to make the zero crossings of the 19 kilohertz pilot carrier signal coincide with those of the 38 kilohertz sub-carrier signals required by federal regulation.

The main channel sum signal L+R from the preemphasis amplifier 48 is combined with the sub-carrier signal as amplitude modulated by the sub-carrier channel difference signal L−R and with the pilot carrier signal in the matrix 52 to provide an amplitude modulated, double sideband, suppressed carrier signal which is passed through a buffer amplifier 64 to the output of the multiplexer. Thus, the modulator itself comprises a multiplex sub-carrier generator.

Figure 3:
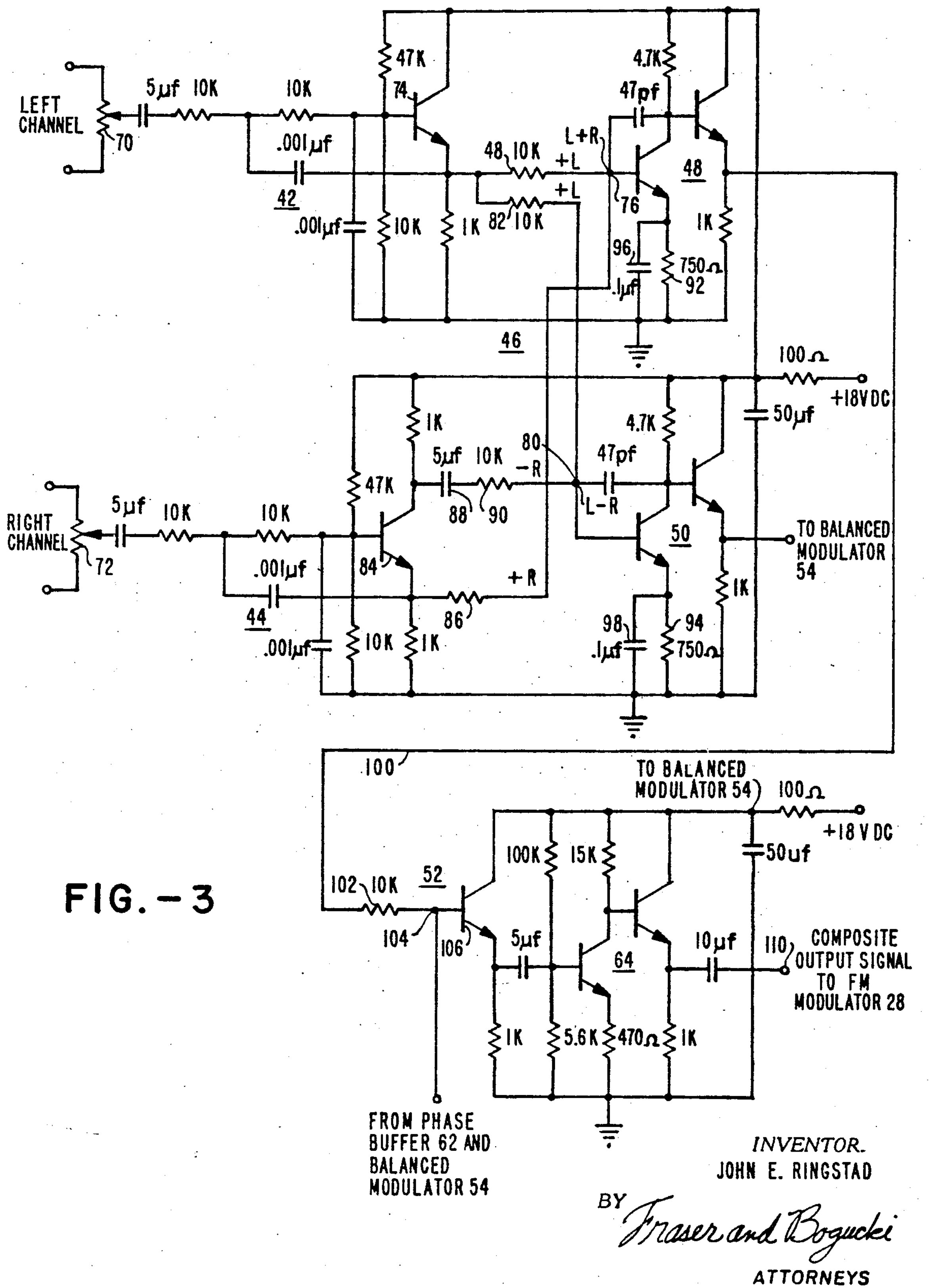
FIGS. 3–5 are schematic diagrams of one preferred circuit for use as the multiplexer of FIG. 2.
Figure 4:
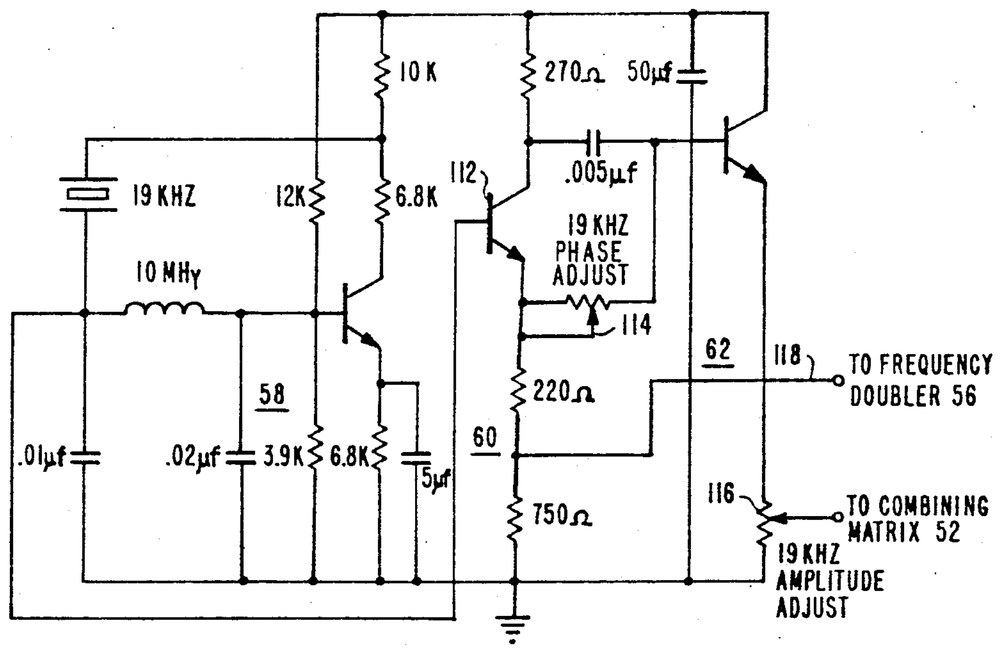
Figure 5:
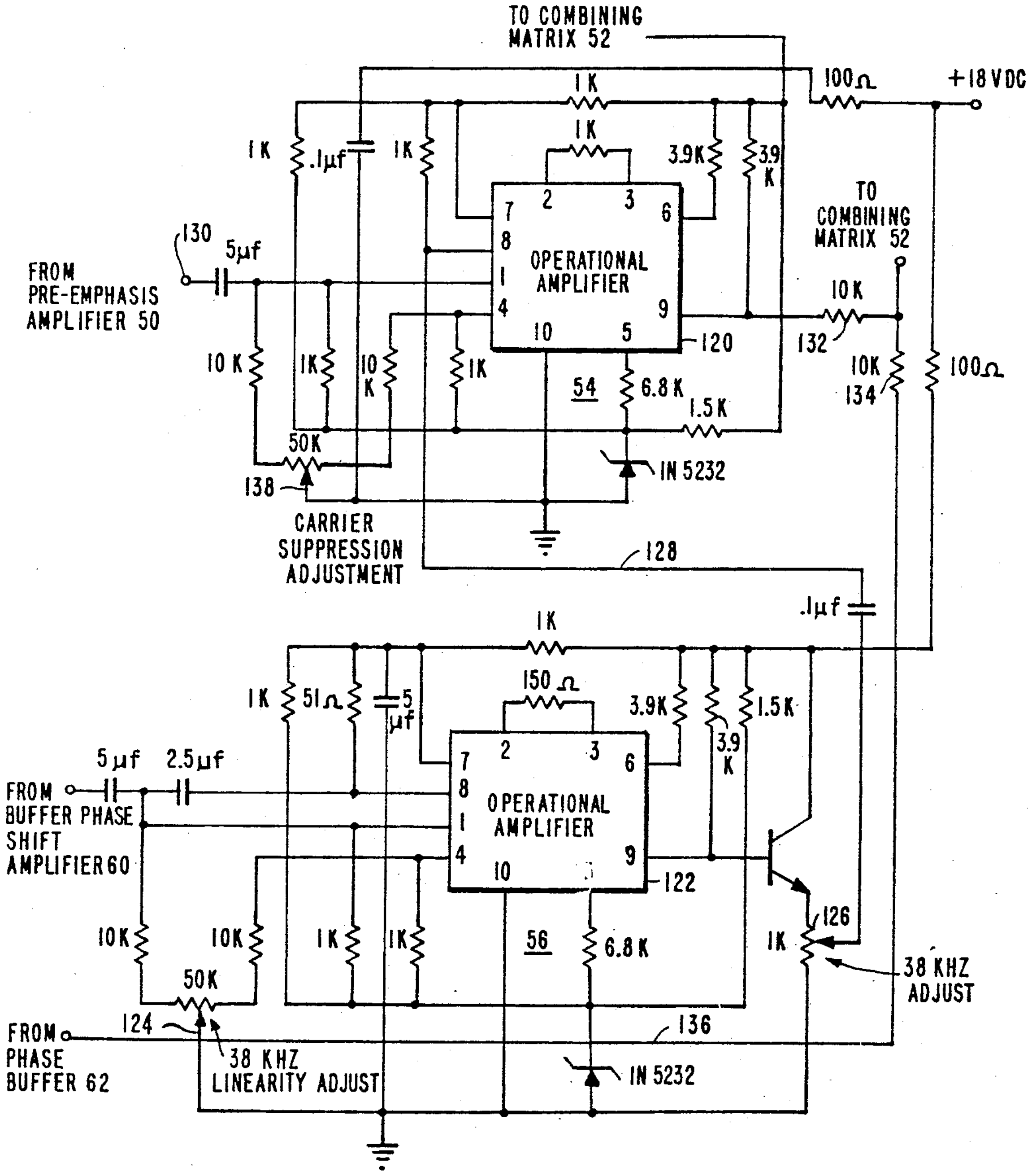

FIGS. 3–5 comprise a schematic diagram of one preferred circuit for use as the multiplexer of FIG. 2. FIG. 3 illustrates those portions of the circuit which comprise the filters 42 and 44, the summing network 46, the amplifiers 48 and 50, the combining matrix 52 and the buffer amplifier 64. FIG. 4 comprises those portions of the circuit which include the oscillator 58, the buffer phase shift amplifier 60 and the phase buffer 62. FIG. 5 illustrates those portions of the circuit which comprise the balanced modulator 54 and the frequency doubler 56.

Referring to FIG. 3, it will be seen that the inputs of the active low pass filters 42 and 44 are respectively coupled to potentiometers 70 and 72 at the outputs of the pre-amplifiers 22 and 24. These input potentiometers provide for amplitude adjustment of the resulting sum and difference signals L+R and L−R and also provide for maxinum cancellation in the sub-carrier or L−R channel. Each of the filters 42 and 44 has a passband of 50–15,000 hertz and attenuates all other frequencies as required by federal regulation. The emitter of a transistor 74 within the filter 42 provides the filtered left channel signal +L, which signal is passed to a terminal 76 at the input of the pre-emphasis amplifier 48 via a resistor 78 and to a terminal 80 at the input of the pre-emphasis amplifier 50 via a resistor 82. The filter 44 includes a transistor 84, the emitter of which provides the filtered right channel signal +R. The +R signal is passed via a resistor 86 to the terminal 76 to produce the sum signal L+R at the input of the pre-emphasis amplifier 48. At the same time the collector of the transistor 84 is coupled through a capacitor 88 for forming a phase splitter which produces the negative right channel signal −R. The signal −R is passed via a resistor 90 to the terminal 80 to form the difference signal L−R at the input of the pre-emphasis amplifier 50. Each of the pre-emphasis amplifiers 48 and 50 provides the required 75 microsecond response curve for wideband commercial FM by use of a 750 ohm resistor 92, 94 at the emitter of the audio amplifier, which resistors 92 and 94 are respectively bypassed by 0.1 microfarad capacitors 96 and 98 respectively.

The output of the pre-emphasis amplifier 48 in the left or main channel is passed via a lead 100 to the combining matrix 52 which includes a resistor 102 coupling the lead 100 to a terminal 104 at the base of a transistor 106. The terminal 104 is coupled to receive the 19 kilohertz pilot carrier signal from the phase buffer 62 and the amplitude modulated sub-carrier signal from the balanced modulator 54. The various signals as so combined are amplified in the buffer amplifier 64 prior to being passed to output terminal 110 coupled to the input of the FM modulator 28.

Referring to FIG. 4, it will be seen that the oscillator 58 comprises a crystal controlled oscillator of the Colpitts type in which the 19 kilohertz pilot carrier signal is taken from the crystal side of the oscillator for purity of waveform. This 19 kilohertz signal is applied to the base of a transistor 112 within the buffer phase shift amplifier 60. The emitter of the transistor 112 is coupled to a potentiometer 114 which is adjusted to provide the desired amount of phase shift of the pilot carrier signal prior to its being applied to a potentiometer 116 within the phase buffer 62. The potentiometer 116 provides for amplitude adjustment of the 19 kilohertz pilot carrier signal prior to the application of the signal to the combining matrix 52 via the terminal 104 of FIG. 3. The 19 kilohertz pilot carrier is also passed via a lead 118 to the frequency doubler 56.

Referring to FIG. 5, it will be seen that the balanced modulator 54 and the frequency doubler 56 each comprise a single integrated circuit in the form of an operational amplifier with appropriate external connections. The operational amplifier 120 within the balanced modulator 54 as well as the operational amplifier 122 within the frequency doubler 56 may comprise integrated circuits of the type sold under the designation MC1496G by Motorola Corporation. The frequency doubler 56 includes a potentiometer 124 for adjusting the linearity of the doubler. The 38 kilohertz subcarrier signal which is produced at a potentiometer 126 is passed via a lead 128 to the balanced modulator 54 where the amplitude thereof is modulated in accordance with the difference signal L–R which is received at an input terminal 130. The resulting modulated subcarrier signal is passed to the terminal 104 of the combining matrix 52 via a resistor 132. The terminal 104 of the combining matrix 52 is also coupled through a resistor 134 and via a lead 136 to receive the 19 kilohertz pilot carrier signal from the phase buffer 62. The balanced modulator 54 includes a potentiometer 138 which provides adjustment of carrier suppression.

It will be noted that the multiplexer circuit of FIGS. 3–5 is free from the variable inductors and variable capacitors which are present in many prior art circuits. Accordingly, no undesirable phase shift or delay is introduced. Moreover, the entire circuit can be fabricated in relatively compact integrated form. One such circuit actually constructed and successfully tested in accordance with the invention is completely contained within a printed circuit card measuring approximately 3½ inches by 6 inches. Such circuit is easily aligned during production and requires little or no further adjustments because of varying field conditions and the like. Such circuit moreover provides for greater than 40 decibels separation. The particular circuit of FIGS. 3–5 depicts component values with the exception of the transistors. All such transistors are of the type 2N5210.

Figure 6:
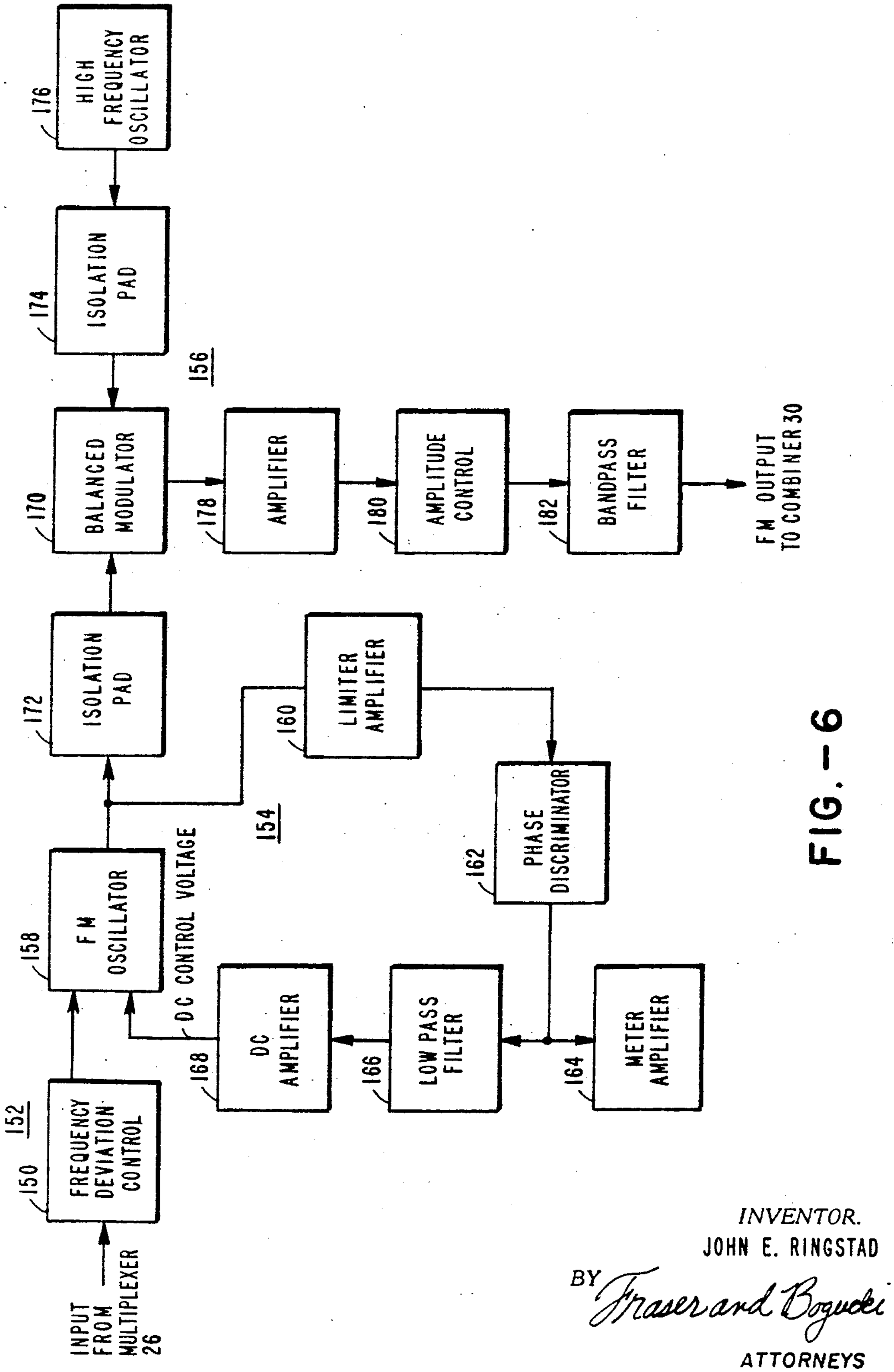

A preferred arrangement of the FM modulator 28 is shown in block diagram form in FIG. 6. In the arrangement of FIG. 6, the audio signal at the output of the multiplexer 26 is applied to a frequency deviation control 150 which controls the amount of frequency deviation which takes place. The control 150 also includes a pre-amplifier section having a 75 microsecond characteristic, which section is used for monaural operation but is switched out for stereo operation since in that case the 75 microsecond characteristic is already provided by the pre-emphasis amplifiers 48 and 50 shown in FIG. 2. The frequency deviation control 150 with its included pre-amplifier section comprises the first or audio portion 152 of three different portions of the modulator 28. The other two portins include an FM portion 154 and a high frequency output portion 156.

the output of the frequency deviation control 150 is applied to an FM oscillator 158 within the FM portion 154 to produce a shift in the frequency of the oscillator 158 at the audio rate. The oscillator 158 is discriminator stabilized by a single integrated circuit which comprises a frequency locked loop and which includes a limiter amplifier 160, a phase discriminator 162, a meter amplifier 164, a low pass filter 166 and a DC amplifier 168. The frequency locked loop provides inherent frequency stability for the oscillator 158 and permits wide frequency excursions where desired. The output of the oscillator 158 is applied to the limiter 160. The output of the limiter amplifier 160 is detected by the discriminator 162 which produces an audio signal at the output thereof. This audio signal is amplified by the meter amplifier 164 before being passed to a meter (not shown) which indicates the frequency deviation. The output of the discriminator 162 is also passed via the low pass filter 166 to the DC amplifier 168. The amplifier 168 provides a varying DC control voltage which is applied to the oscillator 158 to correct any drifts in the frequency thereof.

The FM oscillator 158 produces an FM signal at a nominal carrier frequency which must be raised to the desired level before transmission over the cable. The desired increase in carrier frequency is produced in the high frequency output portion 156. The portion 156 includes a balanced modulator 170 having one input coupled through an isolation pad 172 to receive the FM signal of nominal carrier frequency from the oscillator 158 and a second input coupled through an isolation pad 174 to the output of a high frequency oscillator 176. The more usual practice of raising the carrier frequency of an FM signal is to employ frequency multipliers. Such techniques, however, typically result in degradation of stereo channel separation. Accordingly, the present invention employs the balanced modulator 170 to mix the FM signal of nominal carrier frequency with the output of the high frequency oscillator 176. The results of the mixing process are amplified by an amplifier 178 and adjusted in amplitude by an amplitude control 180 prior to being passed through a bandpass filter 182. As in any mixing process, the modulator 170 produces the two input signals as well as their sum and difference. In this case, however, the difference signal which is achieved by subtracting the FM signal of nominal carrier frequency produced by the oscillator 158 from the high frequency signal provided by the oscillator 176 constitutes the FM signal of desired carrier frequency for transmission over the system. Accordingly, the bandpass filter 182 is tuned to pass this frequency and to prevent passage of the other frequencies including the original input signals to the modulator 170 and the sum thereof. The modulator 170 in effect provides amplitude modulation and produces a double sideband, suppressed carrier FM output. In accordance with the invention, one of the sidebands of this FM signal is eliminated by also tuning the bandpass filter 182 so as to pass only the other sideband therethrough. The single sideband transmission as so employed by the system produces considerable savings in the required bandwidth, yet provides a signal which is readily received by conventional FM receivers upon decoding at the receiver end. The isolation pads 172, 174 comprise six decibel resistor pads which successfully isolate the modulator 170 and enhance the carrier suppression.

In accordance with the invention, the system FM signals are transmitted over the cable at carrier frequency which is below or above but in any event outside of the normal FM band of 88–108 megahertz. In this way, the system FM signals do not interfere with commercial FM signals transmitted over the cable. However, it is also important to choose a frequency range which will not interfere with the transmitted television signals but at the same time is within the bandwidth of the cable. Coaxial television cables are typically rated by their manufacturers as having a bandwidth of 50–300 megahertz, although as a practical matter the bandwidth of such cables may approach a gigahertz. In any event, it is desirable to transmit the system FM at carrier frequencies which are not only within the bandwidth of the cable but which are also not too far removed from the normal FM band. It has been found that the frequency band 73–74 megahertz is a convenient band in which to transmit the system FM signals. This band falls within a 4 megahertz guard band between television channels 4 and 5 and accordingly comprises a clear spot in the frequency spectrum. Certain older systems have a 73.5 megahertz pilot carrier which is an unmodulated carrier or reference. In systems such as these, the system FM may be transmitted at 120 megahertz. Thus, the frequency range 73–74 megahertz has been found suitable for most applications of the invention with 120 megahertz being suitable for certain older systems, although as a practical matter any convenient portion of the frequency spectrum can be used if it does not interfere with the video signals.

Where plural modulators are used within the system to generate two or more system FM signals, it is necessary that such signals be separated in frequency by an amount sufficient to prevent interference therebetween. It has been found that a separation of 0.25 megahertz is satisfactory in this respect. Accordingly, where four different stations or tape players are employed in an FM transmission system according to the invention, the respective FM modulators are tuned to transmit at carrier frequencies of 73 megahertz, 73.25 megahertz, 73.50 megahertz and 73.75 megahertz.

Referring again to FIG. 6, one practical example of the FM modulator shown therein employs an FM oscillator 158 for producing output frequencies of 10.7 megahertz ± 75 kilohertz, the ± 75 kilohertz deviation being produced by the audio. Accordingly, the FM signals at the output of the oscillator 158 have the nominal carrier frequency 10.7 megahertz. The high frequency oscillator 176 is set at 83.7 megahertz so that subtraction of the FM signal of nominal carrier frequency therefrom produces a desired carrier frequency of 73 megahertz at the output.

Figure 7:
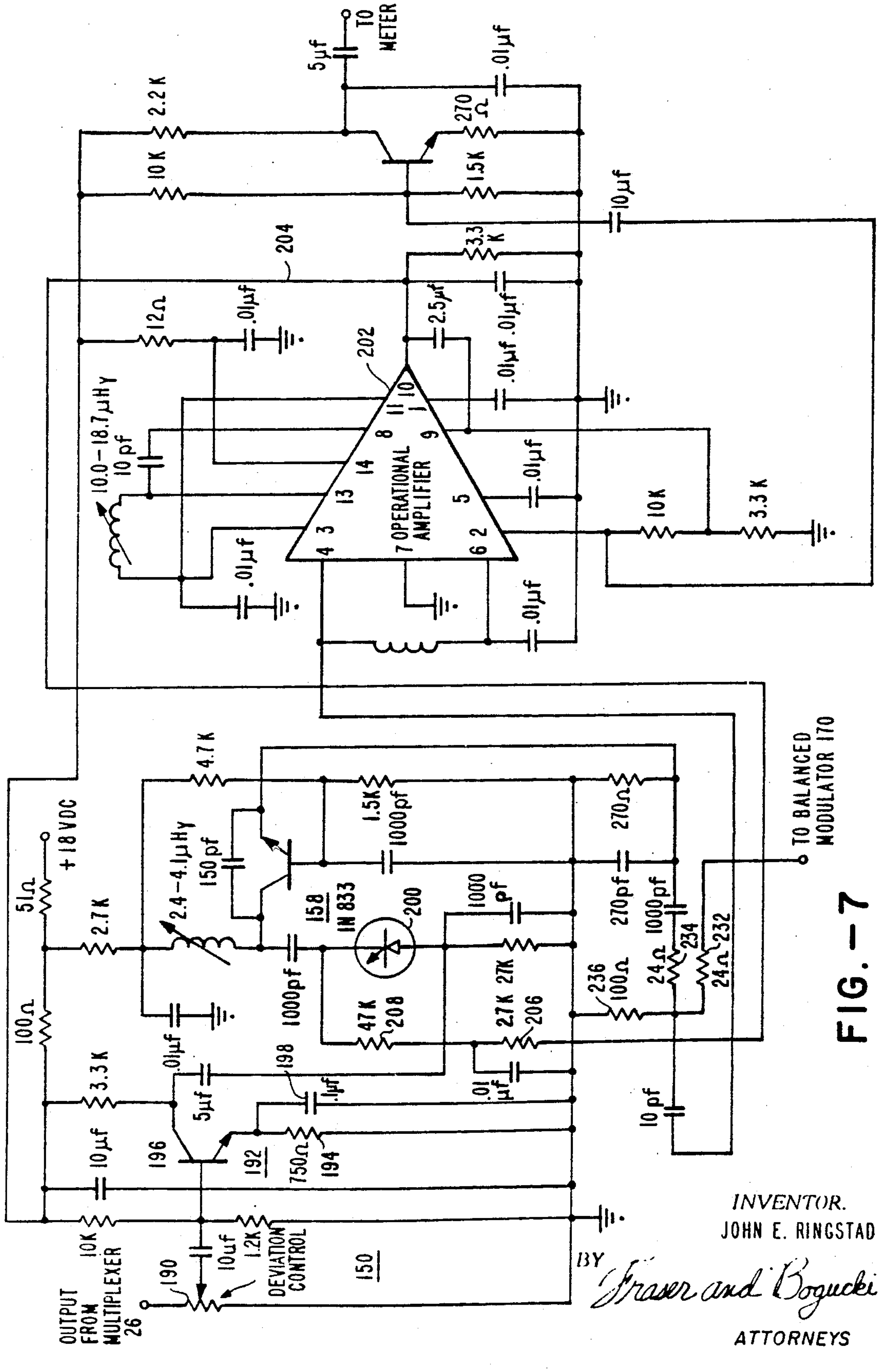
FIGS. 7 and 8 are schematic diagrams of one preferred circuit for use as the FM modulator of FIG. 6.
Figure 8:
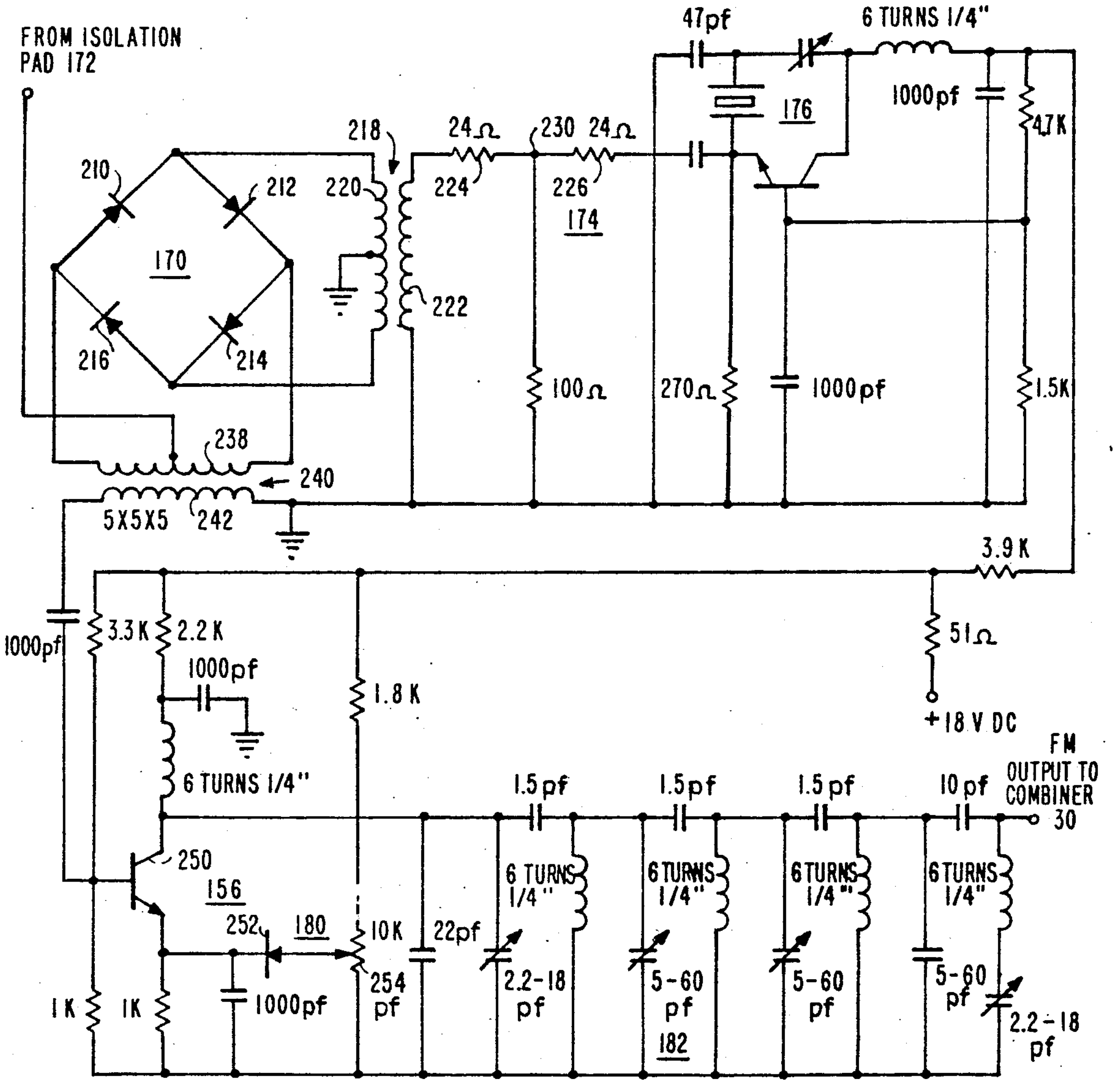

FIGS. 7 and 8 depict in schematic form one preferred circuit which may be used as the FM modulator 28 of FIG. 6. FIG. 7 comprises the audio portion 152 and the FM portion 154 while FIG. 8 comprises the high frequency output portion 156.

Referring to FIG. 7, the frequency deviation control 150 includes a potentiometer 190 coupled to receive the output signal from the multiplexer 26. Adjustment of the potentiometer 190 varies the amount of frequency deviation by a selected amount. As previously mentioned, the frequency deviation control 150 also includes a pre-amplifier portion 192 which is used in the event of monaural transmission. In that event the required 75 microsecond characteristic is provided by a 750 ohm resistor 194 which is coupled to the emitter of a transistor 196 and which is bypassed by a 0.1 microfarad capacitor 198.

The FM oscillator 158 has a varactor diode 200 in the collector tank circuit. The audio signal at the output of the frequency deviation control 150 is applied to the diode 200, thereby causing shifts in the frequency of the oscillator at the audio rate.

As seen in FIG. 7, the frequency locked loop which includes the limiter amplifier 160, the phase discriminator 162, the meter amplifier 164, the low pass filter 166 and the DC amplifier 168 comprises a single integrated circuit in the form of an operational amplifier 202 with external connections and components. The operational amplifier 202 may be of the type sold under the designation MC1351P by Motorola Corporation. The DC control voltage at the output of the operational amplifier 202 is passed via a lead 204 which includes resistors 206 and 208 to the varactor diode 200. This control voltage changes the capacitance of the diode 200 and hence the frequency of the oscillator 158.

Referring to FIG. 8, it will be seen that the high frequency oscillator 176 comprises a crystal controlled, grounded base oscillator of the Colpitts type. The high frequency signal produced by the oscillator 176 is applied to one of the inputs of the balanced modulator 170 which is shown as comprising a ring diode modulator having four diodes 210, 212, 214 and 216 unidirectionally coupled in an endless loop or ring. A first transformer 218 has one winding 220 thereof coupled across the second and third diodes 212, 214 with a center tap thereof grounded. A second winding 222 of the transformer 218 is coupled to receive the high frequency signal from the oscillator 176. The isolation pad 174 will be seen to comprise a pair of resistors 224 and 226 of equal value or 24 ohms serially coupled in a path between the oscillator 176 and the winding 222 and a resistor 228 of different value coupled between a terminal 230 between the resistors 224 and 226 and a source of reference potential or ground. Referring again to FIG. 7, the isolation pad 172 is seen to be identical to the pad 174 and to include a pair of resistors 232 and 234 of 24 ohm value and a resistor 236. The output of the FM oscillator 158 as passed by the isolation pad 172 is applied to the center tap of a first winding 238 of a second transformer 240, the winding 238 being coupled across the third and fourth diodes 214 and 216. A second winding 242 of the transformer 240 couples the output of the ring diode modulator to the amplifier 156.

The amplifier 156 is an RF amplifier having a transistor 250, the emitter-base junction of which is coupled across the amplitude control 180 comprising a steering diode 252 and an associated potentiometer 254. The diode 252 and potentiometer 254 comprise a relatively simple technique for controlling the amplitude of the FM signal. By adjusting the potentiometer 254, the steering diode 252 applies a DC potential of desired value to the base-emitter junction of the transistor 250 to bias the junction and therefore cause a pinching off of the transistor 250 and a corresponding reduction in the amplitude of the FM signal. The bandpass filter 182 comprises a four pole Butterworth filter.

The FM modulator circuit of FIGS. 7 and 8 may be fabricated in relatively compact form. One such circuit constructed and successfully tested in accordance with the invention was formed on a printed circuit card measuring approximately 3½ inches by 6 inches. It will be appreciated that this card when combined with the multiplexer on a card of approximately equal size provides a highly compact transmitting circuit. The circuit is shown in FIGS. 7 and 8 as including all component values or designations with the exception of the transistors, all of which are of the 2N3563 type.

Figure 9:
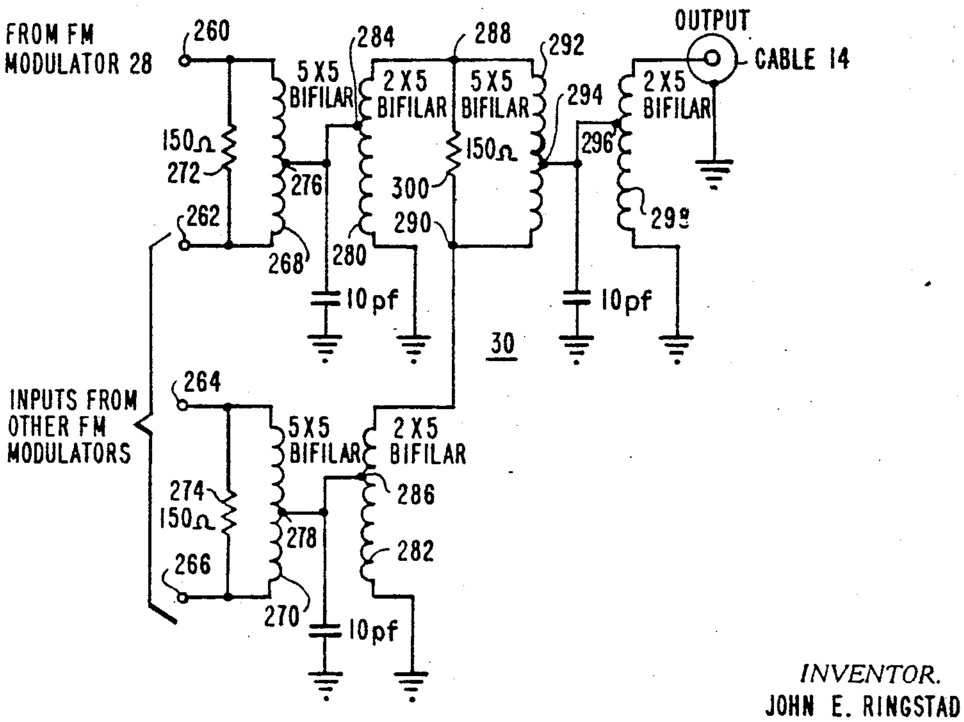
FIG. 9 is a schematic diagram of one preferred circuit for use as the combiner in the system of FIG. 1.

FIG. 9 is a schematic diagram of one preferred circuit which may be used as the combiner 30 for receiving the various FM signals from the modulators and passing them onto the cable 14. As in the case of FIG. 1 it is assumed that there are four different FM modulators so as to provide four different system FM signals for transmission over the cable 14.

As seen in FIG. 9 different pairs of the FM signals are applied to the opposite input terminals 260, 262, 264 and 266 of a pair of symmetrical bifilar transformers 268 and 270 forming the base of a transformer tree. The designations 5 × 5 in FIG. 9 signify that each transformer 268, 270 comprises a pair of overlapping windings of five turns each. Each of the transformers 268 and 270 has a resistor 272, 274 coupled in parallel therewith between the associated pair of input terminals and a center tap 276, 278 coupled to an associated asymmetrical bifilar transformer 280, 282. As indicated by the designations 2 × 5 in FIG. 9 the transformers 280 and 282 have a turns ratio of 2:5 such that the taps 284 and 286 thereof are coupled to locations along the length thereof so as to divide each transformer into a first winding having two turns overlapping a second winding having five turns. The opposite ends of the transformer 280 are coupled between ground and an output terminal 288 comprising the single output of the associated pair of transformers 268 and 280. Similarly the opposite ends of the transformer 282 are coupled between ground and a single output terminal 290 for the pair of transformers 270 and 282.

The transformer tree comprising the combiner 30 of FIG. 9 is arranged such that the single output of each symmetrical-asymmetrical bifilar transformer pair is coupled as one of the two inputs to a different symmetrical-asymmetrical bifilar transformer pair in a succeeding stage so that all of the inputs receiving the FM signals are eventually combined into a single output coupled to the cable 14. In the present example the four different FM signals require a second stage in the transformer tree comprising a single symmetrical-asymmetrical bifilar transformer pair. The transformer pair includes a symmetrical bifilar transformer 292 having its center tap 294 coupled to a tap 296 on the associated asymmetrical bifilar transformer 298 in the same fashion as in the case of the transformer pairs 268, 280 and 270, 282. The opposite ends of the transformer 292 are coupled to different ones of the output terminals 288 and 290 as well as to the opposite ends of a resistor 300. The signal output terminal 302 at the one end of the asymmetrical bifilar transformer 298 is coupled to the center conductor of the cable 14.

The combiner circuit 30 of FIG. 9 comprises a relatively simple and compact arrangement for passing the FM signals onto the cable 14 without interference with one another and with the cable. The various transformer combinations effectively isolate the different system FM channels from one another as well as from the cable 14.

As previously noted the various video and FM signals on the cable 14 are extracted by each individual subscriber station 16 with the video and FM signals being split by the FM-TV splitter 32. One preferred form of circuit which may comprise the splitter 32 is shown in FIG. 10.

Figure 10:
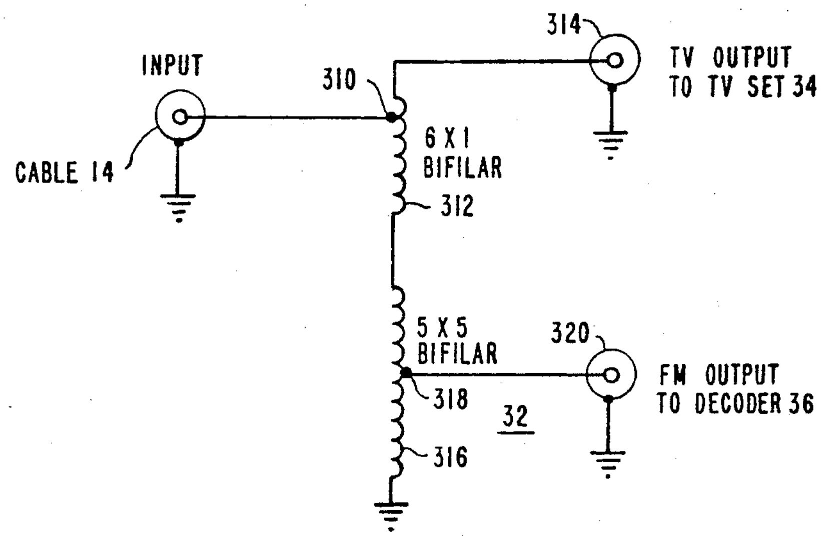
FIG. 10 is a schematic diagram of one preferred circuit for use as the FM-TV splitter in the system of FIG. 1.

As shown in FIG. 10 the center conductor of the cable 14 is coupled so as to apply the combined video and FM signals to a tap 310 on an asymmetrical bifilar transformer 312. The transformer 312 is asymmetrically wound so as to have a turns ratio of 1:6. Thus the one winding on one side of the tap 310 is six times the size of the other winding on the opposite side of the tap 310. The short winding is coupled to the center conductor of a cable 314 which in turn is coupled to the subscriber's TV set 34. The long winding of the transformer 312 is coupled to one end of a symmetrical 5 × 5 bifilar transformer 316 having a grounded opposite end and a center tap 318 coupled to the center conductor of a cable 320. The cable 320 is coupled to the decoder 36.

The circuit of FIG. 10 separates the FM signals carried by the cable 14 from the video signals, the video signals being passed to the cable 314 where they are carried to the subscriber's TV set 34 and the FM signals being passed to the cable 320. As described hereafter the FM signals which comprise a mixture of the system FM signals and commercial FM signals are passed to the subscriber's FM receiver 38 via the decoder 36. The decoder 36 has little effect on the commercial FM signals but decodes the system FM signals by shifting their carrier frequencies into the normal FM band so that they may be received by the subscriber's conventional FM receiver 38. The circuit of FIG. 10 adequately isolates the various cables 14, 314 and 320 from one another while at the same time separating the FM from the video. In one such circuit constructed and successfully tested in accordance with the invention the directivity has been found to be such as to provide approximately 20 db attenuation between the FM cable 320 and the TV cable 314.

Figure 11:
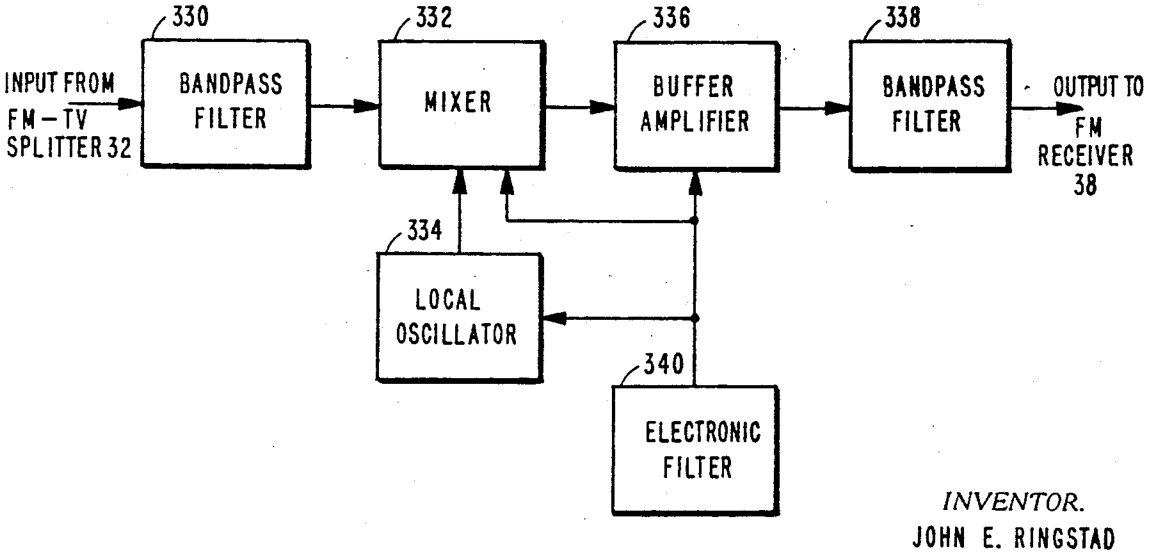
FIG. 11 is a block diagram of one preferred arrangement of a decoder for use in the system of FIG. 1.

One preferred arrangement of the decoder 36 is shown in block diagram form in FIG. 11. In the FIG. 11 arrangement the FM signals as separated from the video signals by the splitter 32 are applied to an input bandpass filter 330 which is tuned to pass the system FM signals without attenuation and to attenuate all other FM signals including the commercial FM signals by a selected amount. The FM signals at the output of the bandpass filter 330 are passed to a mixer 332 where they are mixed with a signal of selected high frequency provided by a local oscillator 334. The resulting sum and difference signals as well as the two original input signals are also amplified in the mixer 332 by an amount substantially equal to the attenuation of the bandpass filter 330 prior to being passed via a buffer amplifier 336 to an output bandpass filter 338. The output bandpass filter 338 is tuned to pass the normal FM band of 88–108 megahertz and to block all other frequencies from the output. An electronic filter 340 filters any AC ripple which may be present in the power supply for the decoder 36.

It will be seen that commercial FM signals are attenuated in the input bandpass filter 330 by an amount which in one practical example of the invention is about 10 decibels prior to being amplified in the mixer 332 by a substantially equal amount. The output bandpass filter 338 which is tuned to the normal FM band allows such signals to pass to the FM receiver 38 unimpeded. Accordingly the decoder 36 provides virtually no interference with the commercial FM signals. On the other hand the system FM signals experience an approximately 10 decibel gain since they are amplified in the mixer 332 without attenuation by the bandpass filter 330. This gain in the system FM signals insures proper reception by the FM receiver 38. It also allows the CATV operator flexibility in choosing a carrier frequency within the normal FM band at which each system FM signal is to be provided to the FM receiver 38. Where desired the cable system operator can blank out a given commercial FM station such as where the station may be a relatively weak one and substitute one of the system FM signals by shifting the carrier frequency thereof to the frequency of the station being blanked out.

As noted the input bandpass filter 330 attenuates all frequencies except those of the system FM signals. Accordingly where the system FM signals are transmitted at carrier frequencies of 73 megahertz 73.25 megahertz, 73.50 megahertz and 73.75 megahertz, the bandpass filter 330 is tuned to attenuate by approximately 10 decibels all frequencies outside of the band 73–74 megahertz. The mixer 332 shifts the carrier frequency of each system FM signal to a desired frequency within the normal FM band of 88–108 megahertz by subtracting each system FM signal from the high frequency signal provided by the local oscillator 334. Thus if it is desired to convert a system FM signal of 73 megahertz to a carrier frequency of 100 megahertz the local oscillator 334 is chosen to provide a 173 megahertz signal. The mixer 332 subtracts the 73 megahertz system FM signal from the high frequency reference signal of 173 megahertz to provide the desired 100 megahertz signal to the FM receiver 38. Such signal is passed by the output bandpass filter 338 to the FM receiver 38. However the output bandpass filter 338 blocks the original 73 megahertz signal, the 173 megahertz reference signal and the sum thereof since it is tuned to pass only the normal FM band of 88–108 megahertz.

Figure 12:
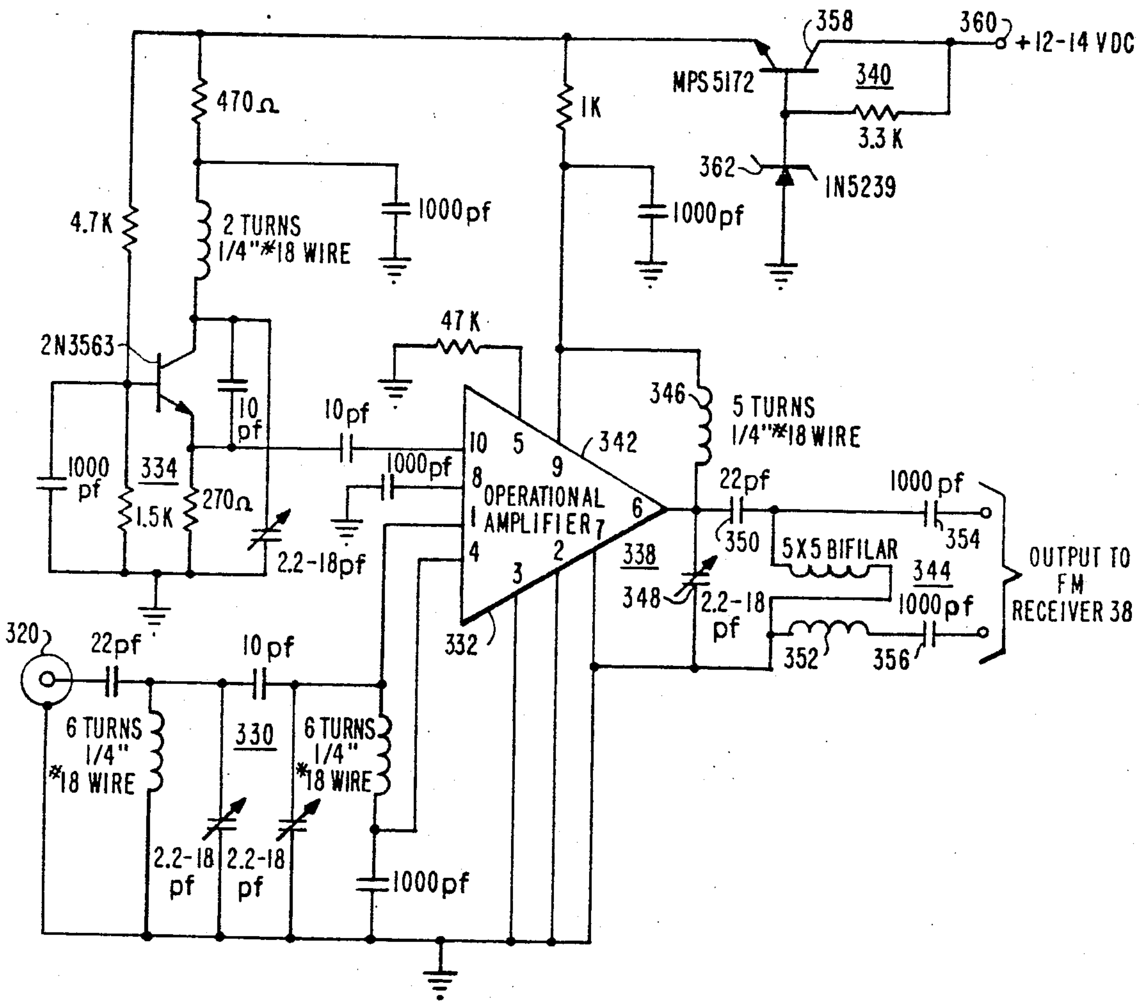
FIG. 12 is a schematic diagram of one preferred circuit for use as the decoder of FIG. 11.

One preferred circuit which may be used as the decoder 36 of FIG. 11 is schematically illustrated in FIG. 12. As shown in FIG. 12 the cable 320 which receives the FM signals as described in connection with FIG. 10 is coupled through the input bandpass filter 330 to the mixer 332. The input bandpass filter 330 comprises a tuned Butterworth filter. The mixer 332 and the buffer amplifier 336 together comprise a single integrated circuit in the form of an operational amplifier 342 with appropriate external connections. The operational amplifier 342 may be of the type sold under the designation MC1550G by Motorola Corporation. The operational amplifier 342 is also coupled to receive the high frequency signal from the local oscillator 334 as shown. The output of the buffer amplifier 336 within the operational amplifier 342 is coupled through the bandpass filter 338 to a matching balun 344. The output bandpass filter 338 comprises an inductor 346, a variable capacitor 348 and a fixed capacitor 450. The matching balun 344 which provides the 300 ohm balanced output impedance required by conventional FM receivers 38 includes a symmetrical bifilar transformer 352 and a pair of capacitors 354 and 356.

The various components of the decoder 36 are fed by a DC power supply which typically contains an AC ripple component. This ripple component frequently produces a hum which is at the very least disturbing and can be so great as to render the system virtually useless. Accordingly it is highly desirable that any AC ripple component be filtered from the DC power supply for the decoder 36. However the filtering capacitors typically employed for this purpose are quite large and would greatly add to the size of the circuitry comprising the decoder 36. Instead an electronic filter 340 in accordance with the invention is employed to filter any AC ripple components. The electronic filter 340 as shown in FIG. 12 includes a transistor 358 coupled in emitter-follower fashion between a power supply terminal 360 and the various components of the decoder 36. A Zener diode 362 is coupled between ground and the base of the transistor 358. It has been found that the combination of the transistor 358 and the Zener diode 362 provides up to 60 decibels of attenuation of ripple, the actual attenuation being related to the $\beta$ of the transistor 358 times the breakdown impedance of the Zener diode 362. The particular circuit shown in FIG. 12 together with appropriate component values or designations has been found to function very well as the decoder 36 for FM transmission systems in accordance with the invention. Such circuit is highly reliable, of relatively low cost, and is easily fabricated in compact form. Such circuits are capable of being completely fabricated on a printed circuit card measuring approximately 1¼ inches × 2 inches.

Figure 13:
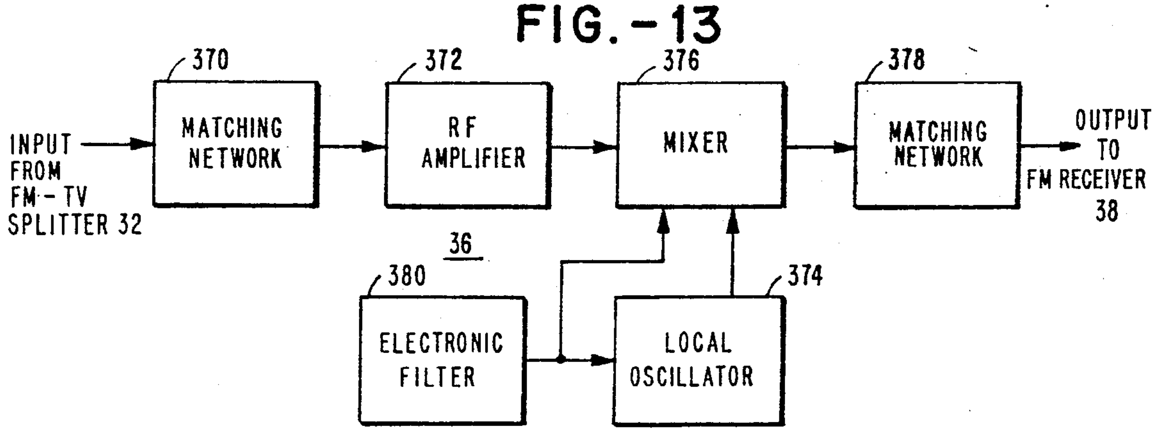
FIG. 13 is a block diagram of an alternative preferred arrangement of a decoder for use in the system of FIG. 1.

A preferred alternative arrangement of the decoder 36 is shown in FIG. 13. In the particular arrangement of FIG. 13 the FM signals separated by the splitter 32 are applied via a matching network 370 to an RF amplifier 372. The input of the circuit of FIG. 13 is broadband and the matching network 370 is matched to the cable. The FM signals at the RF amplifier 372 are mixed with a signal of selected high frequency provided by a local oscillator 374 in a mixer 376. The output of the mixer 376 is passed via a second matching network 378 to the FM receiver 38. The matching network 378 provides isolation of the decoder output and minimizes standing wave ratio. An electronic filter 380 coupled to the oscillator 374 and to the mixer 376 filters any AC ripple in the power supply.

The decoder circuit of FIG. 13 in essence comprises a block frequency converter which shifts the carrier frequencies of the system FM signals into the normal FM band. The circuit is also useful in other applications where the frequencies of signals carried by a cable are to be converted, since the circuit is broadband and matched to provide isolation and minimum standing wave ratio. Unlike the decoder arrangement of FIG. 11 which attenuates the commercial FM signals by a given amount and then subsequently amplifies such signals by substantially the same amount, the arrangement of FIG. 13 does not attenuate either the commercial FM signals or the system FM signals. Instead the commercial FM signals experience a small amount of amplification due to the gain of the mixer 376. On the other hand the system FM signals which are subtracted from the high frequency signal within the mixer 376 experience considerably more amplification.

Unlike the decoder arrangement of FIG. 11, the arrangement of FIG. 13 does not have a filter at its input or its output. However the output bandpass filter 338 shown in the FIG. 11 arrangement could also be used in the FIG. 13 arrangement, and conversely the output filter 338 can be eliminated from the FIG. 11 arrangement if desired. The output filter 338 provides a further check in the filtering process to insure that unwanted signals outside the normal FM band are eliminated. However the FM receiver 38 can be used to provide this filtering action since it is responsive only to the normal FM band.

The absence of filters in the decoder arrangement of FIG. 13 together with the excellent matching and isolation provided by such circuit make the circuit broadband and therefore usable with a wide range of frequencies. Moreover as will be appreciated from the discussion of FIG. 14 to follow the decoder arrangement of FIG. 13 is simpler and therefore less expensive than the arrangement of FIG. 11. However since the arrangement of FIG. 13 has no input filter, problems can arise where the carrier frequencies of the system FM signals are below the normal FM band such as in the 73–74 magahertz range. In that case if the local oscillator 374 is tuned to a frequency of 173 megahertz so as to shift a system FM signal of 73 megahertz to 100 megahertz, for example, then certain of the television signals may also be shifted into the normal FM band. This is particularly true of channel 4 which occupies the band 66–72 megahertz and channel 5 which occupies the band 76–82 megahertz. Where commercial FM reception is very weak or virtually nonexistent, the shifting of certain of the television signals into the normal FM band will normally not pose any problems. Where there is commercial FM reception however, shifting of the television signals into the normal FM band may interfere with one or more such FM stations. Where this problem arises, it is easily overcome by transmitting the system FM signals at a carrier frequency above the normal FM band. For example if a system FM signal is transmitted at 130 megahertz and the local oscillator 374 generates a frequency of 230 megahertz, then subtraction of the two signals will result in the desired carrier frequency of 100 megahertz. At the same time subtraction of the television signals from the 230 megahertz signal will result in signals well above the normal FM band.

Figure 14:
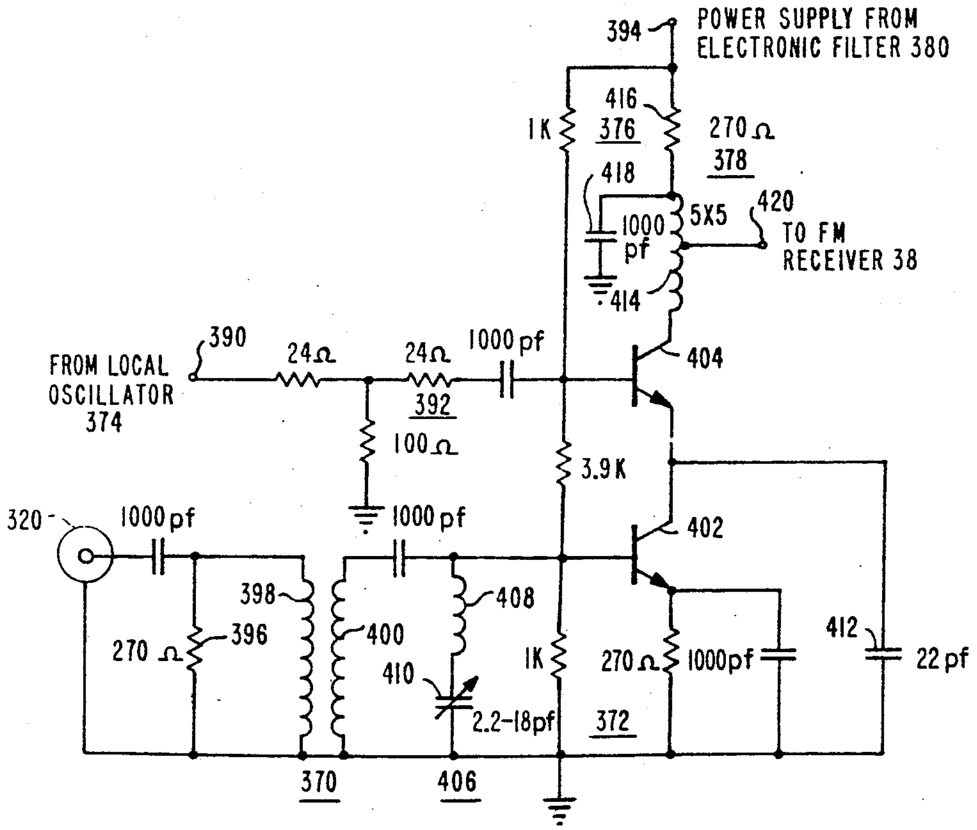
FIG. 14 is a schematic diagram of a portion of one preferred circuit for use as the decoder of FIG. 13.

One preferred circuit for use as the decoder arrangement of FIG. 13 is shown in partial schematic form in FIG. 14. In the FIG. 14 circuit the local oscillator 374 which is not shown comprises the same circuit as the oscillator 334 shown in FIG. 12. This circuit provides its high frequency signal at an input terminal 390 to an isolation pad of resistors 392. Also the electronic filter 380 is identical in form to the filter 340 shown in FIG. 12 and supplies to a terminal 394 at the mixer 376 as well as to the local oscillator 374.

Signals on the FM cable 320 are applied to the matching networks 370 which includes a resistor 396 and a pair of windings 398 and 400. The network 370 provides a 75 ohm match with the cable 320 over a broadband of approximately 20–300 megahertz. The FM signals at the output of the network 370 are applied to the base of a transistor 402 within the RF amplifier 372. The amplifier 372 and the mixer 376 together comprise a cascode stage. The high frequency signal from the oscillator 374 is applied via the resistor pad 392 to the base of a transistor 404 within the mixer 376. Mixing takes place in the base-emitter junction of the transistor 404, which transistor also serves as the collector load for the transistor 402 within the RF amplifier 372. The transistor 402 provides good isolation between the mixing transistor 404 and the cable 320 since the collector junction of the transistor 402 attenuates by approximately 35 decibels any portion of the high frequency signal from the oscillator 374 attempting to pass through that junction to the cable 320. Any such signal experiences further attenuation due to a series trap 406 which is coupled in the base circuit of the transistor 402 and which is tuned to the oscillator 374. The trap 406 includes an inductor 408 and a variable capacitor 410. The practical result is very small back-radiation from the circuit, which is important because of possible interference with other services on the television cable. The junction between the emitter of the transistor 404 and the collector of the transistor 402 is coupled to ground through a capacitor 412 which provides for impedance transformation to allow maximum signal level and which minimizes oscillator feedback. The transistor 404 is loaded by a 5 × 5 bifilar transformer 414 in the matching network 378. The network 378 also includes a resistor 416 and a capacitor 418. The output of the matching network 378 which appears at a terminal 420 is applied to the FM receiver 38 through an output balun identical to the balun 344 shown in FIG. 12. The network 378 provides 300 ohm matching of the circuit at its output end which provides substantial isolation and minimum standing wave ratio.

While the invention has been particularly shown and described with reference to preferred embodiments thereof, it will be understood by those skilled in the art that the foregoing and other changes in form and details may be made therein without departing from the spirit and scope of the invention.

What is claimed is:

1. For use in a cable television system, apparatus for transmitting at least one audio signal through the system as an FM signal which is outside the normal commercial FM transmission band comprising:

means including transducer means for providing a plurality of audio signals;

means responsive to the audio signals for stereo multiplexing the audio signals;

means coupled to the stereo multiplexing means and responsive to the stereo multiplexed audio signals for generating corresponding FM stereo multiplexed signals having carrier frequencies outside the normal commercial FM transmission band; and means coupled to a cable of a cable television system and responsive to the FM signals for transmitting the FM signals over the cable when coupled thereto, said transmitting means comprising a transformer tree coupling the plurality of FM signals to the cable, the transformer tree comprising a different symmetrical bifilar transformer coupled to receive each pair of the FM signals at a pair of inputs thereof, a different asymmetrical bifilar transformer coupled to each symmetrical bifilar transformer and having a single output, the single output of each pair of symmetrical bifilar transformers being coupled to the inputs of a symmetrical bifilar transformer intercoupled with an asymmetrical bifilar transformer having a single output so that a single output of an asymmetrical bifilar transformer comprises a single output of the transformer tree, the single output of the transformer tree being coupled to the cable.

2. For use in a cable television system in which at least one FM signal having a carrier frequency outside the normal commercial FM transmission band is transmitted over a cable for the system, apparatus receiving and decoding the transmitted FM signal for reception by an FM receiver comprising:

means responsive to FM signals having carrier frequencies within the normal commercial FM transmission band for passing the signals without substantial alteration;

means providing a desired carrier frequency within the normal commercial FM transmission band;

means responsive to the transmitted FM signal and to the desired carrier frequency for shifting the carrier frequency of the transmitted FM signal to the desired carrier frequency; and means coupled between a cable of the cable television system and the carrier frequency shifting means for separating FM signals transmitted over the cable from television signals also transmitted over the cable, said means comprising an asymmetrical bifilar transformer having opposite terminals, one of which is coupled to a terminal for receiving television signals, and a tap coupled to the cable, and a symmetrical bifilar transformer having opposite terminals respectively coupled to the other terminal of the asymmetrical bifilar transformer and to a reference potential and a tap coupled to the carrier frequency shifting means.

* * * * *